US012580730B2

(12) United States Patent
Zhang et al.

(10) Patent No.: US 12,580,730 B2
(45) Date of Patent: Mar. 17, 2026

(54) METHOD AND SYSTEM FOR IMPROVING HOMOMORPHIC ENCRYPTION PERFORMANCE BASED ON TRUSTED EXECUTION ENVIRONMENT

(71) Applicant: Nanhu Laboratory, Jiaxing City (CN)

(72) Inventors: Lei Zhang, Jiaxing City (CN); Jiachun Liao, Jiaxing City (CN); Jinhao Yu, Jiaxing City (CN); Zehao Li, Jiaxing City (CN); Panpan Tang, Jiaxing City (CN)

(73) Assignee: Nanhu Laboratory, Jiaxing City (CN)

( * ) Notice: Subject to any disclaimer, the term of this patent is extended or adjusted under 35 U.S.C. 154(b) by 0 days.

(21) Appl. No.: 19/002,162

(22) Filed: Dec. 26, 2024

(65) Prior Publication Data

US 2025/0254022 A1 Aug. 7, 2025

(30) Foreign Application Priority Data

Feb. 4, 2024 (CN) .......................... 202410153567.6

(51) Int. Cl.
*H04L 9/00* (2022.01)
*H04L 9/08* (2006.01)
(52) U.S. Cl.
CPC ............ *H04L 9/008* (2013.01); *H04L 9/0819* (2013.01)
(58) Field of Classification Search
CPC .............................. H04L 9/008; H04L 9/0819
(Continued)

(56) References Cited

U.S. PATENT DOCUMENTS

2020/0036512 A1* 1/2020 Vaikuntanathan ...... H04L 63/08
2020/0036515 A1 1/2020 Vaikuntanathan et al.
(Continued)

FOREIGN PATENT DOCUMENTS

CN 103544450 A * 1/2014 .......... G06F 21/602
CN 113553610 A 10/2021
CN 117094039 A * 11/2023 ............. G06F 21/78

OTHER PUBLICATIONS

Chinese 1st Office Action with English translation , Application No. 202410153567.6, Issue No. 2024032201713230, Applicant: Nanhu University, Title: Method and System for Improving Homomorphic Encryption Performance Based on Trusted Execution Environment, Dated: Mar. 22, 2024.

(Continued)

*Primary Examiner* — Moeen Khan
(74) *Attorney, Agent, or Firm* — Reising Ethington P.C.

(57) ABSTRACT

Provided are a method and system for improving homomorphic encryption performance based on a trusted execution environment (TEE) which includes: acquiring a computing task; decomposing the computing task into a group of subtasks according to a computing function list in the computing task; decomposing the subtasks in turn according to a list of provided basic homomorphic encryption operators (LoHEO) to obtain a suboperation set; labeling a suboperation as a "linear operation" or a "nonlinear operation" according to whether the suboperation can be directly implemented using an element in the LoHEO; processing each suboperation in turn: for a suboperation labeled as the linear operation, determining a homomorphic computing scheme according to a suboperation task, acquiring and using encrypted computing data for homomorphic encryption computing; for a suboperation labeled as the nonlinear (Continued)

operation, completing plaintext computing in a TEE; and returning an encrypted computing result to a user side.

13 Claims, 5 Drawing Sheets

(58) Field of Classification Search
USPC ......................................................... 713/189
See application file for complete search history.

(56) References Cited

U.S. PATENT DOCUMENTS

| 2020/0167503 A1* | 5/2020 | Wei ........................ G06F 21/602 |
| 2020/0320206 A1* | 10/2020 | Cammarota ............ G06F 21/57 |
| 2020/0327250 A1* | 10/2020 | Wang ..................... G06N 20/00 |

OTHER PUBLICATIONS

Chinese Notification to Grant Patent Right for Invention with English translation, Application No. 202410153567.6, Issue No. 2024041901968970, Applicant: Nanhu University, Title: Method and System for Improving Homomorphic Encryption Performance Based on Trusted Execution Environment, Dated: Apr. 19, 2024.

* cited by examiner

METHOD AND SYSTEM FOR IMPROVING HOMOMORPHIC ENCRYPTION PERFORMANCE BASED ON TRUSTED EXECUTION ENVIRONMENT

CROSS-REFERENCE TO RELATED APPLICATION

This patent application claims the benefit and priority of Chinese Patent Application No. 202410153567.6 filed with the China National Intellectual Property Administration on Feb. 4, 2024, the disclosure of which is incorporated by reference herein in its entirety as part of the present application.

TECHNICAL FIELD

The present disclosure belongs to the technical field of homomorphic encryption algorithms and confidential computing, and in particular to a method and system for improving homomorphic encryption performance based on a trusted execution environment.

BACKGROUND

Privacy computing or confidential operation based on CPU level refers to trusted execution environment based on chip-level trusted base, which is not controlled by system layer and kernel layer (that is, even with the highest administrative privilege of a computer system or kernel-level control right, the data and operation in this secure environment still cannot be viewed, tampered with and controlled), thus ensuring the security of data privacy protection and the credibility of operation in the trusted execution environment. At present, the corresponding technologies include x86, Intel Software Guard Extensions (SGX), AMD Secure Encrypted Virtualization (SEV), HYGON China Secure Virtualization (CSV), ARM V9Confidential Compute Architecture (CCA), etc. The confidential computing technology has been widely used in general-purpose chips and integrated into general-purpose computers and servers in the market, such as Intel Xeon servers and HYGON third-generation servers.

Homomorphic encryption is a special encryption technology, which allows to perform computing in an encrypted state and perform operation on the encrypted data without decrypting the data first. This means that after the encrypted data is operated, the result of decryption is about to be matched with the result of the same operation on the private data. Homomorphic encryption not only protects privacy and security, but also allows the computing in a case of encrypting the data, which is of a great significance in the fields of cloud computing and secure multi-party computing. Homomorphic encryption is of a great significance for processing sensitive information and privacy data safely due to its support to the computing in the encrypted state.

Different fully homomorphic encryption schemes represented by bounded gap variance (BGV), Gentry-Sahai-Waters (GSW) and Cheon-Kim-Kim-Song (CKKS), and semi-homomorphism and partially homomorphism schemes such as ElGamal multiplicative homomorphism and Paillier additive homomorphism, etc., support only linear operations such as addition, multiplication, and rotation. However, nonlinear operation is a common computing task, which can only be approximated by Taylor expansion approximation and the like. Improper parameter setting or the transmission of the errors of nonlinear computing results may lead to errors in the final task, such as classification errors in classification tasks.

SUMMARY

An objective of the present disclosure is to reduce the implementation difficulty of homomorphic encryption and improve the efficiency, usability, and accuracy. Based on the accurate division of linear and nonlinear operations, a method for improving homomorphic encryption performance based on a trusted execution environment is achieved by deploying two encryption services, i.e., memory encryption computing and homomorphic encryption computing, according to a division result.

A method for improving homomorphic encryption performance based on a trusted execution environment includes the following steps:

acquiring a computing task;

decomposing the computing task into a group of subtasks according to a computing function list in the computing task;

decomposing the subtasks in turn according to a list of provided basic homomorphic encryption operators to obtain a suboperation set;

labeling a suboperation as a "linear operation" or a "nonlinear operation" according to whether the suboperation can be directly implemented using an element in the list of provided basic homomorphic encryption operators or not;

processing each suboperation in turn:

for a suboperation labeled as the linear operation, determining a homomorphic computing scheme according to a suboperation task, acquiring encrypted computing data which is encrypted according to the homomorphic computing scheme, and using the encrypted computing data for homomorphic encryption computing;

for a suboperation labeled as the nonlinear operation, completing plaintext computing in a trusted execution environment; and returning an encrypted computing result to a user side, where the computing result returned to the user side may be a final computing result, or a final computing result and partial or all intermediate computing results, and the computing result to be returned can be returned to the user side after all computing tasks are completed (including all suboperations of all subtasks); and the intermediate computing results to be returned may also be returned to the user side immediately after obtaining the computing result.

According to the scheme above, the trusted execution environment is used to improve the performance of the homomorphic encryption technology. By providing a corresponding decomposition means, the computing task is divided first according to subtasks, and then the subtasks are divided from the operation dimension according to list of provided basic homomorphic encryption operators (Lo-HEO), thus achieving the accurate division of the linear operation and the nonlinear operation. The division and labeling of the linear operation and the nonlinear operation of the computing task are achieved based on the above accurate division results to ensure that the operation that originally requires the homomorphic encryption (HB) service (here is the abbreviation of the homomorphic computing service module) to approximate the computing through Taylor expansion is completed in trusted execution environment (TEE), thus achieving the performance improvement of the homomorphic encryption technology while avoiding the high threshold parameter selection that depends on error propagation prediction and control in the approximate computing of the HE service.

In the method for improving homomorphic encryption performance based on a trusted execution environment, the method further includes the following steps:

forming, according to the subtasks, a computing diagram comprising data required by each subtask and a data transfer relationship between the subtasks; and processing the subtasks in turn according to the computing diagram.

Processing various subtasks in turn according to the computing diagram includes a processing sequence of the subtasks, acquisition of data required when processing a corresponding subtask, and output of a result to the corresponding subtask after the processing is finished.

In the method for improving homomorphic encryption performance based on a trusted execution environment, the suboperation for the homomorphic encryption computing is executed, and computing data thereof is encrypted by the trusted execution environment or the user side according to the homomorphic computing scheme.

If the user side participates in the generation of a homomorphic key for homomorphic encryption, the user side is configured to generate the homomorphic key for the suboperation and encrypt the computing data. Otherwise, the trusted execution environment is configured to generate the homomorphic key for the suboperation and encrypt the homomorphic key. A user can encrypt all computing data involved in the computing task with the own user key, and provide the encrypted computing data to a server.

In the method for improving homomorphic encryption performance based on a trusted execution environment, for the suboperation that needs to return a computing result to the user side and is labeled as the "linear operation" (usually, the computing result of the last suboperation needs to be returned to the user side), in a case that the user side participates in the generation of a homomorphic key, the computing result of the homomorphic encryption computing is directly returned to the user side; and in a case that the user side does not participate in the generation of the homomorphic key, the computing result of the homomorphic encryption computing is provided to the trusted execution environment, and the trusted execution environment is configured to decrypt the computing result, re-encrypt the computing result with the own user key of the user, and return the re-encrypted computing result to the user side.

In the method for improving homomorphic encryption performance based on a trusted execution environment, a computing result of the suboperation labeled as the "linear operation" is stored in a homomorphic computing encryption data module, or provided to the trusted execution module and then saved in a data cache module of the trusted execution environment.

The computing result that does not need to be returned to the user side can be stored in the homomorphic computing encryption data module. The computing result that needs to be returned to the user side, such as a final computing result, is provided to the data cache module of the trusted execution environment.

A computing result of the suboperation labeled as the "nonlinear operation" is cached in the data cache module of the trusted execution environment.

If the data cache module is insufficient in space, old data is encrypted and then transferred from the data cache module to a data management unit external to the trusted execution environment by replacing the old data with new data, and the latest computing result is saved in the data cache module. The key for re-encryption and saving may be the user key, or a key generated by the executed execution environment itself. The computing result of the suboperation may be used in the subsequent suboperation computing. Therefore, the trusted execution environment is used here for caching or encrypting and saving the computing result, or the homomorphic computing encryption data module is configured to encrypt and save the computing result. If the computing result is cached or encrypted and saved using the trusted execution environment, the computing result is directly used subsequently according to a computing mode of the suboperation to be used (the data is located in the data cache module of the trusted execution environment for plaintext computing in TEE), or decrypted for use (the data is located in the data management unit for plaintext computing in TEE), or the data is encoded and encrypted for use (the data is located in the data cache module for homomorphic encryption computing external to TEE), or decrypted and then re-encoded and encrypted for use (the data is located in the data management unit for the homomorphic encryption computing external to TEE). If the computing result is encrypted and saved using the homomorphic computing encryption data module, the corresponding operation can be performed when the computing result needs to be used subsequently. For example, if the computing result is inconsistent with an encryption mode required by the homomorphic computing scheme of the corresponding suboperation or needs to be used by the nonlinear computing operation, the computing result can be provided to the trusted execution environment for corresponding operation. If the computing result is consistent with an encryption mode required by the homomorphic computing scheme of the corresponding suboperation, the computing result is directly provided to the homomorphic computing service module for homomorphic computing.

In the method for improving homomorphic encryption performance based on a trusted execution environment, in response to a current encryption state of the computing data required by the suboperation labeled as the "linear operation" being consistent with a homomorphic computing scheme thereof, encrypted computing data is directly used to execute the current suboperation.

Otherwise, the trusted execution environment or the user side is configured to re-encrypt the computing data with the current encryption state being inconsistent with the homomorphic computing scheme thereof according to the homomorphic computing scheme thereof, thus executing the current suboperation. Certainly, if the computing data is in a plaintext state in the TEE environment, decryption is not required, and the computing data is directly re-encrypted according to the homomorphic computing scheme. In the computing data used by one suboperation, if encryption states of some data are consistent while encryption states of some data are inconsistent, it is only necessary to re-encrypt the inconsistent part.

The computing data of each suboperation includes a computing result of an early suboperation and/or all or part of private data.

In the method for improving homomorphic encryption performance based on a trusted execution environment, the method further includes the following steps: acquiring a user key and private data encrypted by the user key, where computing data of a first suboperation of the computing task is the private data.

The user key is archived locally through a trusted archiving technology.

The computing result returned to the user side is encrypted with the key provided by the user side. When the user side does not participate in the generation of the homomorphic encryption key, or the suboperation corresponding to the computing result is obtained by plaintext computing in the trusted execution environment, the user key of the user side is configured to encrypt a computing result needing to be returned to the user side. When the user side participates in the generation of the homomorphic encryption key, the computing result is encrypted by the homomorphic key generated at the user side.

In the method for improving homomorphic encryption performance based on a trusted execution environment, the method further includes the following steps: monitoring noise of the homomorphic encryption computing, and starting TEE denoising when a noise threshold is reached;

decrypting computing data and computing results of a current homomorphic computing scheme using the trusted execution environment, re-encoding and encrypting the decrypted computing data and computing results, and providing the re-encoded and encrypted computing data and computing results to homomorphic computing service for continuously performing homomorphic encryption computing.

By using the TEE environment that already exists and is provided for improving the homomorphic encryption performance, the homomorphic encryption computing is subjected to denoising, there is no need to do complex hardware and software processing for denoising alone, and there is no need for additional denoising means, which effectively improves the denoising effect and efficiency.

A system for improving homomorphic encryption performance based on a trusted execution environment, including an encryption computing server for providing safety computing for a user side. The computing server includes a trusted execution environment, a homomorphic computing service module and a communication control module communicating with one another, thus executing the method for improving homomorphic encryption performance based on a trusted execution environment above.

The trusted execution environment is configured to perform plaintext computing, decrypt a homomorphic computing result, encrypt a computing result, and encrypt homomorphic encryption computing data.

The homomorphic computing service module is configured to determine a homomorphic computing scheme according to a suboperation task, and perform homomorphic encryption computing based on computing data.

The communication control module is configured to communicate with the user side, manage encrypted data external to the TEE, and decompose and allocate a computing task.

In the system for improving homomorphic encryption performance based on a trusted execution environment, the system further includes a user side for initiating a computing request to the encryption computing server, the user side is configured to encrypt the computing data and submit the encrypted computing data to the encryption computing server with a user key and the computing task.

The user side or the trusted execution environment is configured to encrypt computing data labeled as a "linear operation", thus providing a corresponding homomorphic computing scheme for homomorphic encryption computing.

The communication control module includes a homomorphic computing encryption data module, and a TEE encryption data module. The homomorphic computing encryption data module is configured to store encrypted data of the computing result of the homomorphic encryption computing and encryption computing data required by homomorphic computing. The TEE encryption data module is configured to store data encrypted by the trusted execution environment (such as a computing result).

The present disclosure has the advantages that:

1. The trusted execution environment is used to improve the performance of the homomorphic encryption technology, which is conducive to high-performance implementation of the homomorphic encryption technology scheme.

2. In this scheme, the decomposition of the computing task is provided, and the corresponding decomposition means is given, and the division and labeling means for the linear operation and the nonlinear operation are also provided. By achieving accurate division, two encryption computing services, i.e., the memory encryption computing and homomorphic encryption computing, are deployed according to a division result, it is ensured that the operation that requires the HE service to approximate the computing through Taylor expansion is completed in the TEE, thus achieving the performance improvement of the homomorphic encryption technology and the accurate computing of the computing task.

3. Through task decomposition and accurate division of the linear and nonlinear operations, dynamic TEE encryption computing and HE computing are deployed for different operation tasks. The whole computing task is a mixed task of HE computing and TEE encryption computing. With its highly trusted execution environment, the TEE encryption computing performs plaintext computing in the process of participating in the computing, which naturally has the denoising function. Therefore, this scheme improves the efficiency of the homomorphic encryption algorithm and the reliability of the computing result while ensuring the security of the private data and the computing result.

DETAILED DESCRIPTION OF THE EMBODIMENTS

Figure 1A:
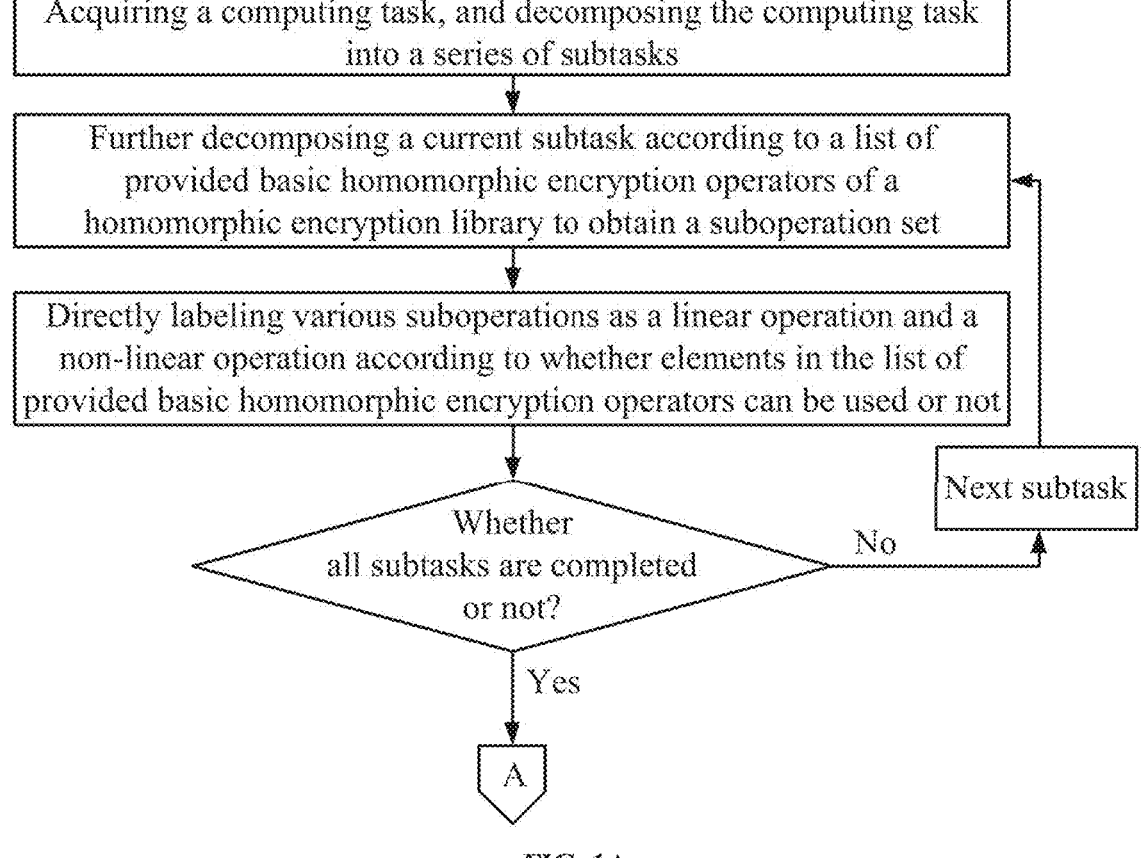
FIGS. 1A-1B are flow diagrams of a method for improving homomorphic encryption performance based on a trusted execution environment according to the present disclosure.
Figure 1B:
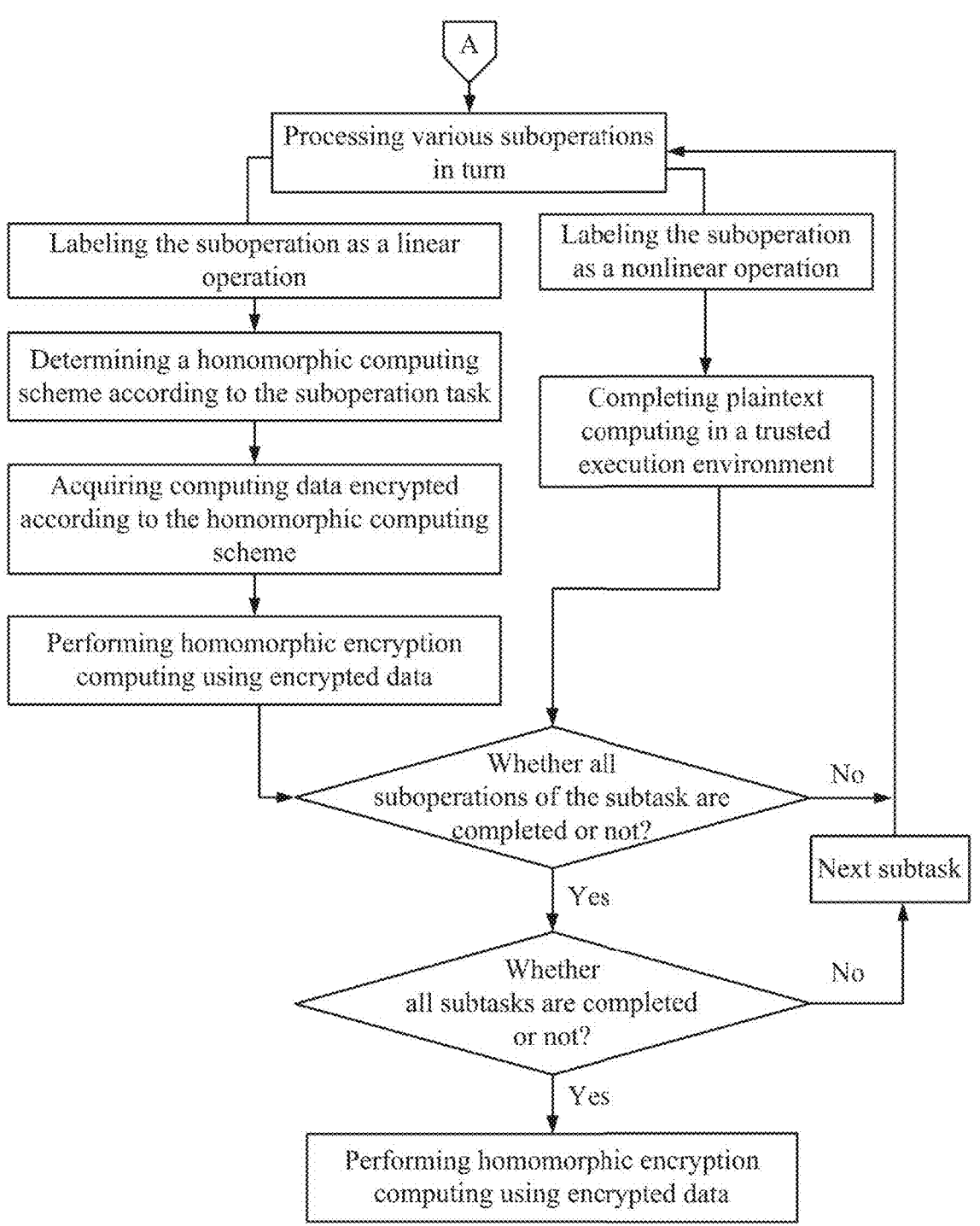
Figure 2A:
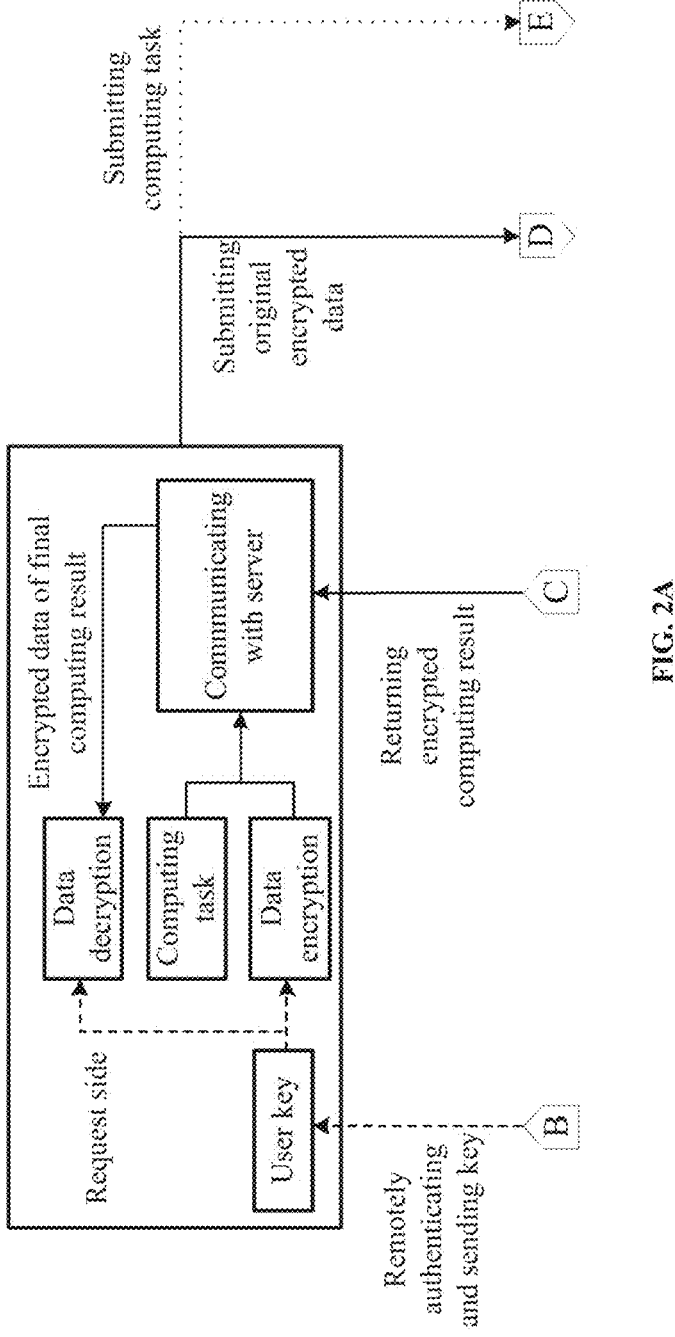
FIGS. 2A-2B are implementation block diagrams of a method for improving homomorphic encryption performance based on a trusted execution environment according to the present disclosure.
Figure 2B:
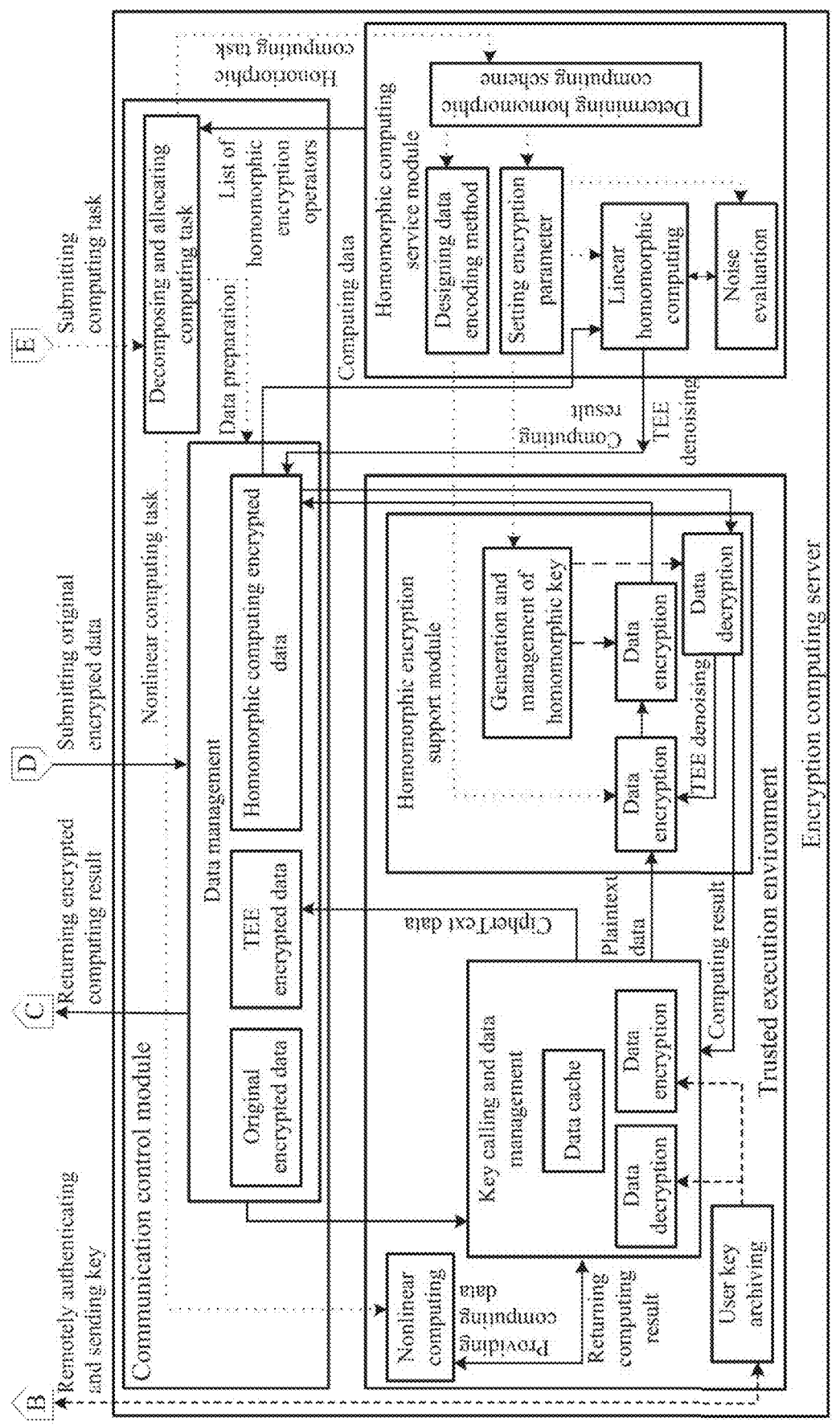

The present disclosure is further described in detail below with reference to accompanying drawings and specific embodiments.

This scheme provides a method and system for improving homomorphic encryption performance based on a trusted execution environment. The system involves two device roles: a user side which is usually used by a user; and an encryption computing server which provides encryption computing service for the computing task of the user. The user side is an interactive portal between the user and the system, which mainly completes the generation of a user key for private data encryption, private data encryption, computing result decryption, computing task generation, and interaction with the encryption computing server. The encryption computing server can provide two privacy protection technologies, i.e., homomorphic computing and trusted execution environment, and configure and call two computing services according to the computing task of the user, thus achieving efficient and reliable encryption computing and protecting the data security in use.

Embodiment 1

In this method, a request side is configured to execute the following steps:

> according to the data security requirements, a user key UK (user key) for data encryption is generated, and the private data (PD, i.e. user data) is encrypted.

It should be noted that the user key UK may also be configured to encrypt the communication with the encryption computing server. The user key UK may be a symmetric key, or an asymmetric key.

The user side can generate a computing task CT and submit the computing task to the encryption computing server according to an application demand, thus starting TEE service and HE service of the encryption computing server.

TEE remote authentication: the user side is configured to remotely authenticate the trusted execution environment of the encryption computing server. If the authentication is trusted, the user key UK is sent to the TEE of the encryption computing server, and TEE can archive the key using the sealing technology for subsequent data encryption and decryption.

The private data is submitted, and the user side is configured to encrypt data required by the computing task with the user key UK and transmit the encrypted data to the encryption computing server.

As shown in FIGS. 1A-1B and FIGS. 2A-2B, the encryption computing server is configured to execute the following steps after receiving the computing task, and can achieve the performance improvement of the homomorphic encryption technology using the trusted execution environment through the following steps, thus providing homomorphic computing service with higher performance for the computing task.

The computing task CT submitted by the request side is received, and the computing task is decomposed into a group of subtasks {Ct_i, i=1, 2, . . . , k} according to a computing function list in the computing task CT.

For example, for a reasoning task CT of a single-layer classification convolutional network (an output result is "the probability of the inputs belonging to different categories"), the computing of which can be decomposed into four subtasks: Ct_1←convolution operation, Ct_2←MaxPool, Ct_3←matrix operation, and Ct_4←softmax function computing.

A computing diagram is formed according to the subtasks. The data required by each subtask of CT and the data transfer between the subtasks are stored in the computing diagram. The subtasks are processed in turn according to the computing diagram, including a processing sequence of subtasks, acquisition of data required when processing the corresponding subtasks, and application of results to the computing of the corresponding subtasks after processing.

8

Figure 3:
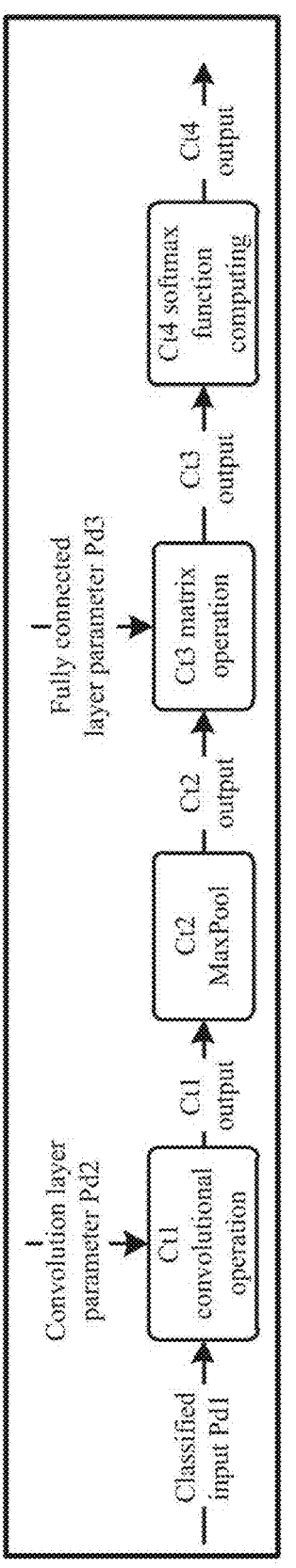
FIG. 3 is an example of a computing diagram generated through a method for improving homomorphic encryption performance based on a trusted execution environment according to the present disclosure.

The computing diagram of the above example is as shown in FIG. 3, where the private data PD={Pd_j, j=1,2,3}, that is, Pd_j is a user data subset.

The following steps are circularly executed until the computing task is completed, that is, all the subtasks are completed.

Decomposition and labeling of subtasks: the encryption computing server is configured to further decompose the current subtask according to a list of provided basic HE operators (LoHEO) of a homomorphic encryption library to obtain a suboperation set, and label each suboperation computed in the subtask as a "linear operation" or "nonlinear operation" according to whether the suboperation can be directly implemented by the element in LoHEO such as homomorphic additive and homomorphic multiplication, thus forming a suboperation computing list. The following A and B are continuously executed according to the suboperation computing list until the subtasks are completed.

In above example, the subtask Ct_1 convolutional operation can be implemented only using homomorphic additive and homomorphic multiplication operators, and the suboperations of this subtask are all linear operation. In the subtask Ct_4 softmax function computing (as shown in formula (1)), index computing exp( ) is the nonlinear operation, and the suboperations of this subtask include the nonlinear operation and the linear operation.

$$s(x_i) = \frac{e^{x_i}}{\sum_{j=1}^{n} e^{x_j}} \tag{1}$$

where x is an output of previous sub-operation, i and j are used to distinguish different vector elements, and $s(x_i)$ is an output of the softmax subtask.

A. Preparation of computing data: the computing data of each suboperation includes a computing result of early suboperation and/or all or part of private data. The encrypted computing data required by the suboperation of the homomorphic computing is stored in the homomorphic computing encryption data module, and the homomorphic computing encryption data module provides the computing data required by the homomorphic computing to the homomorphic computing service module. The computing data of each suboperation includes three conditions: the computing data include all or partial private data; the computing data includes a computing result; and the computing data includes a computing result and all or partial private data. The first condition is mostly in the reasoning of the first suboperation (in an artificial neural network (ANN), the first suboperation often includes all the private data). The subsequent suboperations, according to specific computing task, may include the computing result of the early suboperation, or include the computing result of the early suboperation and all or part of the private data. The computing result of the early suboperation may be the computing result of any one or more early suboperations.

B. There are two conditions as below according to the labeling condition of the suboperation (1) Linear operation, includes the following steps:
① Generation of HE scheme and parameters, in which the homomorphic computing service module (HE service for short) is configured to determine a homomorphic computing scheme and a data encoding method according to a linear computing task, and set homomorphic encryption computing parameters according to a parameter mapping table and security parameters.

The CKKS homomorphic encryption scheme is used as an example. According to a security parameter λ, a polynomial dimension n and coefficient modulus size, i.e., a bit length log q of the coefficient modulus, can be determined by the following parameter mapping table, as shown in Table 1.

TABLE 1

Parameter mapping table with CKKS homomorphic
encryption scheme as example

| | n | log q | | n | log q | | n | log q |
|---|---|---|---|---|---|---|---|---|
| λ = 128 | 1024 | 27 | λ = 192 | 1024 | 19 | λ = 256 | 1024 | 14 |
| | 2048 | 54 | | 2048 | 37 | | 2048 | 29 |
| | 4096 | 109 | | 4096 | 75 | | 4096 | 58 |
| | 8192 | 218 | | 8192 | 152 | | 8192 | 118 |
| | 16384 | 438 | | 16384 | 305 | | 16384 | 237 |
| | 32768 | 881 | | 32768 | 611 | | 32768 | 476 |

②Wake of homomorphic encryption support module in TEE, in which the HE service sends the homomorphic encryption computing parameters, the encoding method and an encryption algorithm to the TEE, for the generation of homomorphic key for the homomorphic encryption, data encoding and data encryption. The homomorphic encryption support module is mainly configured to generate the homomorphic key for the homomorphic computing, encrypt the computing data required for the homomorphic computing based on the homomorphic key and the homomorphic encryption computing parameters, and then provide the encrypted computing data to the HE service for homomorphic encryption computing. If the encoding is included, the computing data is further encoded according to the current homomorphic computing scheme.

③HE linear operation, in which the HE service can acquire the computing data for encryption based on the trusted execution environment and the current homomorphic computing scheme for linear operation.

For each suboperation, when the suboperation is labeled as the "linear operation", its computing result is provided to the trusted execution environment and saved in the data cache module of the trusted execution environment. If the computing result of the suboperation of the current homomorphic encryption computing needs to be provided to the user side (for example, the suboperation is the last suboperation of the processed computing task), the encrypted data of the computing result is provided to the trusted execution environment. The trusted execution environment is configured to decrypt the computing result and encrypt the decrypted computing result using the user key, and finally return the encrypted computing result to the user side.

When a current encryption state of the computing data required by the suboperation labeled as the "linear operation" is consistent with a homomorphic computing scheme thereof, the encrypted computing data is directly used to execute the current suboperation. Otherwise, the trusted execution environment is configured to decrypt the computing data with the current encryption state inconsistent with the homomorphic computing scheme thereof and re-encrypt the computing data according to the homomorphic computing scheme thereof, thus executing the current suboperation.

For example, when the current suboperation is the "linear operation", the involved computing data includes part of private data. Due to an encryption mode of this part of private data is consistent with the encryption mode required by the homomorphic computing scheme determined by the current suboperation (this usually happens because this part of the private data is used by the suboperation labeled as the "linear operation" in the early period and stored in the homomorphic computing encryption data module, and the homomorphic computing scheme used by the early suboperation is consistent with the encryption mode of the homomorphic computing scheme used by the current suboperation, so the private data required by the current homomorphic computing scheme is in an encryption state required at present because of the computing of the early suboperation), this part of the private data can be used directly.

For another example, when the current suboperation is the "linear operation", the involved computing data includes part of private data. When an encryption mode of this part of private data is inconsistent with the encryption mode required by the homomorphic computing scheme determined by the current suboperation, the trusted execution environment is required to encode and encrypt this part of private data according to the current homomorphic computing scheme (This usually happens because this part of private data is not used by the early suboperations, or although this part of private data has been used by a certain early suboperation using the homomorphic computing scheme, the encryption mode is inconsistent with the homomorphic computing scheme used by the current operation, so the computing data required by the current computing scheme stored in the homomorphic computing encryption data module cannot be directly used).

Preferably, the noise of the homomorphic encryption computing is monitored, and when the noise threshold is reached, TEE denoising is started.

By the trusted execution environment, the computing data and computing result of the current homomorphic computing scheme are decrypted, encoded (if required), re-encrypted and then provided for the HE service for continuous homomorphic encryption computing.

(2) Nonlinear operation includes the following steps: when the suboperation is labeled as the "nonlinear operation", plaintext nonlinear operation is performed in TEE, and the computing result of the suboperation is cached in the data cache module of the trusted execution environment.

If the next suboperation is still the nonlinear operation, the plaintext nonlinear computing is performed continuously in the TEE, or the continuous non-linear operations can be combined as one suboperation. If the next suboperation is the linear operation, the computing data of the next suboperation is encrypted and then provided to the HE service for homomorphic encryption computing.

If the data cache module is insufficient in space, old data is encrypted and then transferred from the data cache module to a data management unit external to the trusted execution environment by replacing the old data with new data, and the latest computing result is saved in the data cache module. The key for re-encryption and saving may be the user key, or a key generated by the executed execution environment itself, and the former is preferred in this embodiment. The computing result of the suboperation may be used in the subsequent suboperation computing. Therefore, the trusted execution environment is used here for caching or encrypting and saving the computing result. The computing result is directly used subsequently according to a computing mode of the suboperation to be used (the data is located in the data cache module of the trusted execution environment for plaintext computing in TEE), or the computing result is decrypted for use (the data is located in the data management unit for plaintext computing in TEE), or the data is encoded and encrypted for use (the data is located in the data cache module for homomorphic encryption computing external to TEE), or the data is decrypted and then re-encoded and encrypted for use (the data is located in the data management unit for the homomorphic encryption computing external to TEE). In the process of executing the step A, if the computing data of the suboperation involves the computing result of the early suboperation, the computing result can be prepared through the above various condition.

For the computing result that does not participate in the subsequent computing, such as the final result, the computing result is encrypted and then transferred from the data cache module to a data management unit external to the trusted execution environment, and then the encrypted computing result can be returned to the user side.

After the computing is finished, the encryption computing server is configured to encrypt a required computing result, which at least includes the final computing result, using the user key UK, and return the encrypted computing result to the user side. Certainly, the initial user key UK may not be used here, which should not be limited to this key or encryption mode here.

The user side may use the known user key UK to decrypt the computing result to obtain a plaintext computing result.

Embodiment 2

This embodiment is similar to Embodiment 1, and the difference is that in Embodiment 1, the user side does not participate in the generation of the homomorphic key, and the user side in this embodiment participates in the generation of the homomorphic key.

Specifically, in this embodiment, the user side is configured to encrypt the computing data required by the suboperation labeled as the "linear operation" according to the homomorphic computing scheme. A computing result computed by the server through the homomorphic encryption computing is directly returned to the user side. As the homomorphic key is generated by the user side itself, an encrypted computing result can be decrypted using the homomorphic key generated by the user side itself. In this scheme, the user side needs to participate in the computing process. Therefore, the mode in Embodiment 1 has less communication expenditure, and can reduce the computing delay relatively.

Embodiment 3

This embodiment is similar to Embodiment 1, and the difference is that the computing result of the homomorphic computing encryption is stored in the homomorphic computing encryption data module in this embodiment, and when the computing result needs to be used subsequently, the trusted execution environment is configured to perform the corresponding operation. For example, when the subsequent nonlinear computing needs to use the computing result, the corresponding computing result is decrypted by the trusted execution environment, and the decrypted computing result is used in the trusted execution environment for plaintext nonlinear computing. When the subsequent linear computing needs to use the computing result, if the encryption mode is consistent, the computing result is directly provided to the homomorphic computing service module; if the encryption method is inconsistent, the computing result is provided to the trusted execution environment, and the trusted execution environment is configured to decrypt the computing result and re-encrypt the decrypted computing result according to the current homomorphic computing scheme, and then directly provide the re-encrypted computing result to the homomorphic computing service module, or the computing result is provided to the homomorphic computing service module through the homomorphic computing encryption data module.

In the above embodiments, the "consistent encryption mode" includes the consistency of the encryption mode itself, and the consistency of the encoding mode before data encryption for those that need to be encoded.

Specific embodiments described in this embodiment are only illustrative of the spirit of the present disclosure. According to the present disclosure, those skilled in the art can make various modifications or supplements to the described specific embodiments or replace them in a similar way, without departing from the spirit of the present disclosure or exceeding the scope defined in the appended claims.

The invention claimed is:

1. A method for improving homomorphic encryption performance based on a trusted execution environment, comprising following steps:

acquiring a computing task;

decomposing the computing task into a group of subtasks according to a computing function list in the computing task;

decomposing each subtask of the group of subtasks in turn according to a list of provided basic homomorphic encryption operators to obtain a suboperation set;

labeling each suboperation in the suboperation set as a "linear operation" or a "nonlinear operation" according to whether the suboperation is able to be directly implemented using an operator in the list of provided basic homomorphic encryption operators or not;

processing each suboperation labeled in turn until the computing task is completed to obtain an encrypted computing result, comprising:

for a suboperation labeled as the linear operation, determining a homomorphic computing scheme according to a suboperation task, acquiring encrypted computing data which is encrypted according to the homomorphic computing scheme, and using the encrypted computing data for homomorphic encryption computing;

for a suboperation labeled as the nonlinear operation, completing plaintext computing in the trusted execution environment;

returning the encrypted computing result to a user device;

storing a homomorphic encryption computing result of the suboperation labeled as the "linear operation" in a homomorphic computing encryption data module, or providing the homomorphic encryption computing result to the trusted execution environment and then saving the homomorphic encryption computing result in a data cache module of the trusted execution environment, wherein the homomorphic encryption computing result is generated by the homomorphic encryption computing using the encrypted computing data;

caching a plaintext computing result of the suboperation labeled as the "nonlinear operation" in the data cache module of the trusted execution environment, wherein the plaintext computing result is generated by the plaintext computing in the trusted execution environment;

for computing data required by the suboperation labeled as the "linear operation" and in response to determining a current encrypted state of the computing data being consistent with a homomorphic computing scheme of the computing data, directly using the computing data to execute a current suboperation; otherwise, re-encrypting, by the trusted execution environment, the computing data in order to execute the current suboperation;

wherein the computing data of each suboperation comprises a computing result of an early suboperation and all or part of private data;

further comprises following steps: acquiring a user key and private data encrypted by the user key, wherein computing data of a first suboperation of the computing task is the private data;

the user key is archived locally through a trusted archiving technology; and the computing result returned to the user device is encrypted with the user key provided by the user device;

monitoring noise of the homomorphic encryption computing, and starting the trusted execution environment for denoising when a noise threshold is reached;

decrypting computing data and computing results of a current homomorphic computing scheme using the trusted execution environment, re-encoding and encrypting the decrypted computing data and computing results, and providing the re-encoded and encrypted computing data and computing results to homomorphic computing service for continuously performing homomorphic encryption computing.

2. The method according to claim 1, further comprising following steps:

forming, according to the subtasks, a computing diagram comprising data required by each subtask and a data transfer relationship between the subtasks; and processing the subtasks in turn according to the computing diagram.

3. The method according to claim 1, wherein the suboperation for the homomorphic encryption computing is executed, and computing data thereof is encrypted by the trusted execution environment or the user device according to the homomorphic computing scheme.

4. The method according to claim 2, wherein the suboperation for the homomorphic encryption computing is executed, and computing data thereof is encrypted by the trusted execution environment or the user device according to the homomorphic computing scheme.

5. The method according to claim 4, wherein for the suboperation that needs to return a computing result to the user device and is labeled as the "linear operation", in a case that the user device participates in generation of a homomorphic key, a computing result of the homomorphic encryption computing is directly returned to the user device; and in a case that the user device does not participate in the generation of the homomorphic key, the computing result of the homomorphic encryption computing is provided to the trusted execution environment, and the trusted execution environment is configured to decrypt the computing result, re-encrypt the computing result with a user key of the user, and return the re-encrypted computing result to the user device.

6. The method according to claim 5, wherein in a case that the data cache module is insufficient in space, old data is encrypted and then transferred from the data cache module to a data management unit external to the trusted execution environment by replacing the old data with new data, and the latest computing result is saved in the data cache module.

7. A system for improving homomorphic encryption performance based on a trusted execution environment, comprising an encryption computing server for providing safety computing for a user device, wherein the encryption computing server comprises a processor and a memory storing program codes, wherein the processor performs the stored program codes to:

acquiring a computing task;

decomposing the computing task into a group of subtasks according to a computing function list in the computing task;

decomposing each subtask of the group of subtasks in turn according to a list of provided basic homomorphic encryption operators to obtain a suboperation set;

labeling each suboperation in the suboperation set as a "linear operation" or a "nonlinear operation" according to whether the suboperation is able to be directly implemented using one operator in the list of provided basic homomorphic encryption operators or not;

processing each suboperation labeled in turn until the computing task is completed to obtain an encrypted computing result, comprising:

for a suboperation labeled as the linear operation, determining a homomorphic computing scheme according to a suboperation task, acquiring encrypted computing data which is encrypted according to the homomorphic computing scheme, and using the encrypted computing data for homomorphic encryption computing;

for a suboperation labeled as the nonlinear operation, completing plaintext computing in the trusted execution environment;

returning the encrypted computing result to a user device;

storing a homomorphic encryption computing result of the suboperation labeled as the "linear operation" in a homomorphic computing encryption data module, or providing the homomorphic encryption computing result to the trusted execution environment and then saving the homomorphic encryption computing result in a data cache module of the trusted execution environment, wherein the homomorphic encryption computing result is generated by the homomorphic encryption computing using the encrypted computing data;

caching a plaintext computing result of the suboperation labeled as the "nonlinear operation" in the data cache module of the trusted execution environment, wherein the plaintext computing result is generated by the plaintext computing in the trusted execution environment;

for computing data required by the suboperation labeled as the "linear operation" and in response to determining a current encrypted state of the computing data being consistent with a homomorphic computing scheme of the computing data, directly using the computing data to execute a current suboperation; otherwise, re-encrypting, by the trusted execution environment, the computing data in order to the current suboperation;

wherein the computing data of each suboperation comprises a computing result of an early suboperation and all or part of private data;

further comprises following steps: acquiring a user key and private data encrypted by the user key, wherein computing data of a first suboperation of the computing task is the private data;

the user key is archived locally through a trusted archiving technology; and the computing result returned to the user device is encrypted with the user key provided by the user device;

monitoring noise of the homomorphic encryption computing, and starting the trusted execution environment for denoising when a noise threshold is reached;

decrypting computing data and computing results of a current homomorphic computing scheme using the trusted execution environment, re-encoding and encrypting the decrypted computing data and computing results, and providing the re-encoded and encrypted computing data and computing results to homomorphic computing service for continuously performing homomorphic encryption computing.

8. The system according to claim 7, wherein the system further comprises a user device which comprises a processor and a memory storing program codes, wherein the processor performs the stored program codes for:

initiating a computing request to the encryption computing server;

encrypting computing data required by each subtask and submit the encrypted computing data to the encryption computing server with a user key and a computing task;

encrypting computing data required by each suboperation labeled as a "linear operation" for homomorphic encryption computing according to a corresponding homomorphic computing scheme.

9. The system according to claim 7, wherein the method further comprising following steps:

forming, according to the subtasks, a computing diagram comprising data required by each subtask and a data transfer relationship between the subtasks; and processing the subtasks in turn according to the computing diagram.

10. The system according to claim 7, wherein the suboperation for the homomorphic encryption computing is executed, and computing data thereof is encrypted by the trusted execution environment or the user device according to the homomorphic computing scheme.

11. The system according to claim 9, wherein the suboperation for the homomorphic encryption computing is executed, and computing data thereof is encrypted by the trusted execution environment or the user device according to the homomorphic computing scheme.

12. The system according to claim 11, wherein for the suboperation that needs to return a computing result to the user device and is labeled as the "linear operation", in a case that the user device participates in generation of a homomorphic key, a computing result of the homomorphic encryption computing is directly returned to the user device; and in a case that the user device does not participate in the generation of the homomorphic key, the computing result of the homomorphic encryption computing is provided to the trusted execution environment, and the trusted execution environment is configured to decrypt the computing result, re-encrypt the computing result with a user key of the user, and return the re-encrypted computing result to the user device.

13. The system according to claim 12, wherein in a case that the data cache module is insufficient in space, old data is encrypted and then transferred from the data cache module to a data management unit external to the trusted execution environment by replacing the old data with new data, and the latest computing result is saved in the data cache module.

* * * * *